US 9,647,537 B2
(45) Date of Patent: May 9, 2017

(54) CHARGE PUMP CIRCUIT FOR GENERATING A NEGATIVE VOLTAGE

(71) Applicant: Commissariat à l'Énergie Atomique et aux Énergies Alternatives, Paris (FR)

(72) Inventor: François Ayel, Saint Blaise du Buis (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 14/917,538

(22) PCT Filed: Sep. 19, 2014

(86) PCT No.: PCT/FR2014/052334
§ 371 (c)(1),
(2) Date: Mar. 8, 2016

(87) PCT Pub. No.: WO2015/040336
PCT Pub. Date: Mar. 26, 2015

(65) Prior Publication Data
US 2016/0226376 A1 Aug. 4, 2016

(30) Foreign Application Priority Data

Sep. 23, 2013 (FR) ..................................... 13 59117

(51) Int. Cl.
*H02M 3/07* (2006.01)
(52) U.S. Cl.
CPC ........ *H02M 3/07* (2013.01); *H02M 2003/071* (2013.01)

(58) Field of Classification Search
CPC ............................................... H02M 2003/071
See application file for complete search history.

(56) References Cited

U.S. PATENT DOCUMENTS

| 4,679,134 A | * | 7/1987 | Bingham | ................ | H02M 3/07 257/299 |
| 6,021,056 A | * | 2/2000 | Forbes | .................... | H02M 3/07 327/536 |

(Continued)

FOREIGN PATENT DOCUMENTS

| EP | 1791245 A1 | 5/2004 |
| EP | 1271440 A1 | 1/2013 |

OTHER PUBLICATIONS

Written Opinion, dated Apr. 20, 2015, from corresponding International Application No. PCT/FR2014/052334.

(Continued)

*Primary Examiner* — Jeffrey Zweizig
(74) *Attorney, Agent, or Firm* — Wolf, Greenfield & Sacks, P.C.

(57) ABSTRACT

A circuit for generating a negative voltage on the basis of a positive voltage, including: at least one first transistor between a first terminal for applying a potential greater than a reference potential and a first node; a first capacitive element between the first node and a second node, a control terminal of said first transistor being linked to the second node; a first switch between the first node and a second terminal for applying the reference potential; a second switch between the second node and a third terminal for providing said negative voltage; a third switch between the second node and the second terminal; and a second capacitive element between the third terminal and the second terminal.

12 Claims, 4 Drawing Sheets

(56) References Cited

U.S. PATENT DOCUMENTS

| | | | |
|---|---|---|---|
| 6,130,572 A | 10/2000 | Ghilardelli et al. | |
| 6,674,317 B1 | 1/2004 | Chou et al. | |
| 7,282,985 B2* | 10/2007 | Yen | H02M 3/07 307/110 |
| 7,622,984 B2* | 11/2009 | Lesso | H02M 3/07 327/535 |
| 8,054,054 B2 | 11/2011 | Lee | |
| 9,111,601 B2* | 8/2015 | Cassia | G11C 5/145 |
| 9,236,796 B2* | 1/2016 | Liu | H02M 3/07 |
| 9,312,755 B2* | 4/2016 | Wang | H02M 3/07 |
| 2004/0057259 A1* | 3/2004 | Oddone | H02M 3/073 363/60 |
| 2008/0272833 A1* | 11/2008 | Ivanov | H02M 3/07 327/536 |

OTHER PUBLICATIONS

International Search Report, dated Apr. 20, 2015, from corresponding International Application No. PCT/FR2014/052334.
Huque et al.: "An SOI-based High-Voltage, High-Temperature Gate-Driver for Sic FET," 2007 Department of Electrical and Computer Engineering, The Univerity ogf Tennessee, Knoxvile; pp. 1491-1495.
Peftitsis et al.: "Self-Powered Gate Driver for Normally ON Silicon Carbide Junction Field-Effect Transistors Without External power Supply," 2013 IEEE Transactions on Power Electronics; pp. 1488-1501.
Falahi et al.: "Intergrated Anti-Short-Circuit Safety Circuit in CMOS SOI for Normally-On JFET," 2012 CIPS; pp. 11.2.
Norling et al.: "An Optimized Driver fo SiC JFET-Based Switches Delivering More Than 99% Efficiency," 2012 ISSCC; pp. 284-286.

\* cited by examiner

US 9,647,537 B2

CHARGE PUMP CIRCUIT FOR GENERATING A NEGATIVE VOLTAGE

CROSS-REFERENCE TO RELATED APPLICATIONS

This application is the national phase of International Application No. PCT/FR2014/052334, filed on Sep. 19, 2014, which claims the priority benefit of French Application No. 13/59117, filed on Sep. 23, 2013, which applications are hereby incorporated by reference to the maximum extent allowable by law.

BACKGROUND

The present invention generally relates to electronic circuits and, more particularly, to a circuit for generating a negative voltage from a positive power supply voltage.

DISCUSSION OF THE RELATED ART

Many charge pump circuits including circuits intended to generate a negative voltage from a positive power supply voltage are known. In particular, it has already been provided to use a field-effect transistor to supply, from a positive voltage, a switched-capacitance charge pump circuit. An example of such a circuit is described in article "Integrated Anti-Short-Circuit Safety Circuit in CMOS SOI for Normally-On JFET" of Khalil El Falahi et al. (CIPS 2012, Mar. 6-8, 2012, Nuremberg, Germany). A JFET transistor, used to recover the power from a positive power supply bus, has its gate permanently directly connected to ground. This circuit requires using a precharge circuit upstream of the capacitive charge pump circuit.

SUMMARY

An embodiment of the present disclosure aims at providing a circuit for generating a negative voltage from a positive voltage which overcomes all or part of usual solutions.

Another embodiment of the present disclosure aims at providing a circuit compatible with various applications capable of using a negative voltage.

Another embodiment of the present disclosure aims at a particularly simple solution.

Thus, an embodiment of the present disclosure aims at a circuit for generating a negative voltage from a positive voltage, comprising:

at least a first transistor between a first terminal of application of a voltage higher than a reference potential and a first node;

a first capacitive element between the first node and a second node, a control terminal of said first transistor being connected to the second node;

a first switch between the first node and a second terminal of application of the reference potential;

a second switch between the second node and a third terminal for providing said negative voltage;

a third switch between the second node and the second terminal; and a second capacitive element between the third terminal and the second terminal.

According to an embodiment, the circuit comprises a first resistive element between the first terminal and the first transistor.

According to an embodiment, the circuit further comprises:

a fourth switch between the control terminal of the first transistor and the second node; and a fifth switch between the control terminal of the first transistor and a fourth terminal of application of a potential higher than the reference potential.

According to an embodiment, the circuit further comprises:

at least a second transistor between said first terminal and the control terminal of the first transistor, the control terminal of the second transistor being connected to the second node; and a second resistive element, interposed between the control terminal of the first transistor and the second node.

According to an embodiment, the circuit further comprises a third resistive element between the second transistor and the first terminal.

According to an embodiment, said transistor(s) are N-channel transistors.

According to an embodiment, all switches are N-channel MOS transistors.

The present invention also provides a method for controlling a circuit such as hereabove, wherein:

in a first phase, the first and second switches are off while the third switch is on; and in a second phase, the first and second switches are on while the third switch is off.

According to an embodiment, the first and second phases are repeated.

According to an embodiment, intervals having durations shorter than those of the first and second phases, and where all switches are off, are interposed between the successive phases.

According to an embodiment:

during the first phase(s), the fourth switch is off and the fifth switch is on; and during the second phase(s), the fourth switch is on and the fifth switch is off.

The invention also provides an electronic circuit comprising at least one circuit for generating a negative voltage from a positive voltage.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
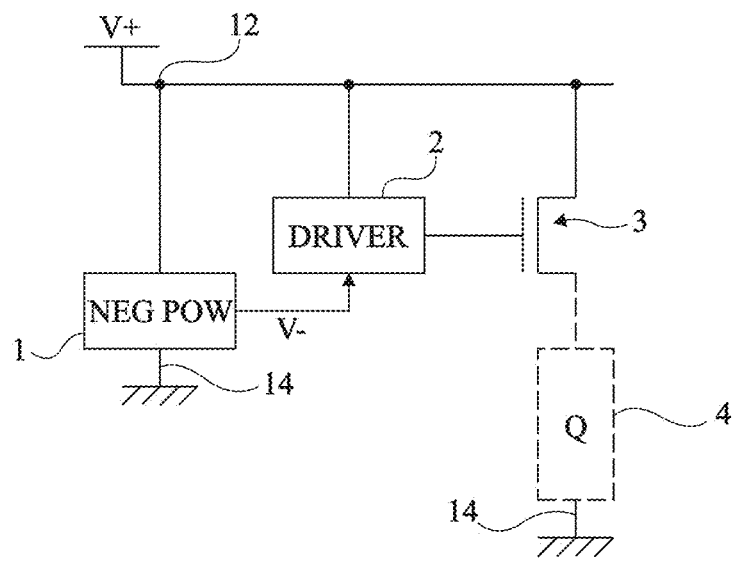
FIG. 1 very schematically shows in the form of blocks a first example of application of a circuit providing a negative voltage.

The same elements have been designated with the same reference numerals in the different drawings. For clarity, only those elements which are useful to the understanding of the embodiments which will be described have been shown and will be detailed. In particular, the destination of the described charge pump circuit has not been detailed, the described embodiments being compatible with usual applications using a charge pump circuit for providing a negative voltage from a positive voltage. Further, when reference is made to the positive or negative character of the voltage, it is referred to a same intermediate potential between the positive voltage and the negative voltage. For simplification, it is considered that this reference potential is the ground (zero potential) of the electronic circuit, which will generally be true in practice, so that the positive and negative voltages correspond to the potentials of the corresponding terminals. However, all that will be described hereafter applies to positive and negative voltages defined by potentials, respectively upper and lower, to a reference potential which is not necessarily the ground (for example, potentials both negative with respect to ground, the ground then forming the upper potential of the positive voltage and the reference potential being the least negative potential).

FIG. 1 schematically shows, in the form of blocks, an example of application of a charge pump circuit 1 (NEG POW) for generating a negative voltage V− from a positive voltage V+. According to this embodiment, negative voltage V− is used to power a control circuit 2 (DRIVER) of a transistor 3 (typically, a MOS transistor) in series with a load 4 (Q) between terminals 12 of application of a positive potential V+ and 14, for example, a ground potential, or a potential corresponding to the high point of the charge. In such an application, the voltages involved at the level of load 4 and the switching thresholds of transistor 3 result in the need for a negative potential V− in order to properly control transistor 3.

Figure 2:
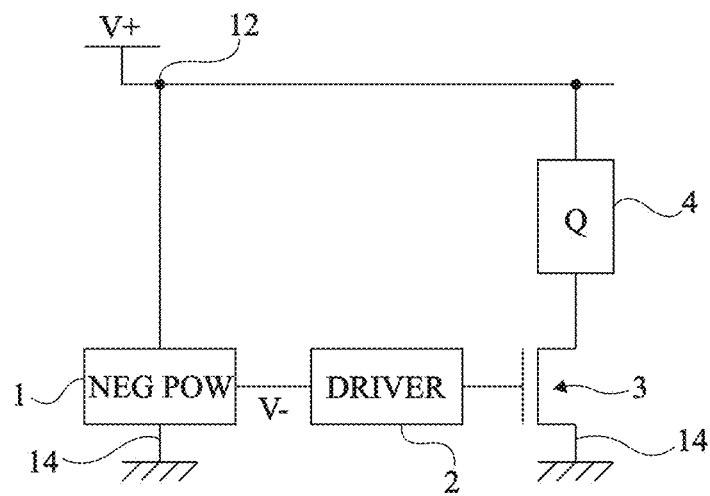
FIG. 2 schematically shows in the form of blocks a second example of application of a circuit providing a negative voltage.

FIG. 2 schematically shows in the form of blocks another example of application of a circuit for generating a negative voltage V−. Voltage V− is, here again, delivered to a circuit 2 for controlling a power transistor 3, series-connected with a load 4 (Q) powered with a positive voltage. Transistor 3 is here connected on the ground side. Here again, according to the involved voltages and to the switching thresholds of transistor 3, a negative potential may be needed in order to control it properly.

For example, the negative voltage may be used to lock a switch (transistor 3) having a normally-on state. Another example is the control of a power transistor having a threshold voltage close to zero and which requires a biasing of its control terminal with a negative voltage to draw away from its threshold voltage and avoid for parasitic voltages to modify the off or on state. Another example is the control of an IGBT transistor which sometimes uses a negative voltage to perform an efficient locking.

Figure 3:
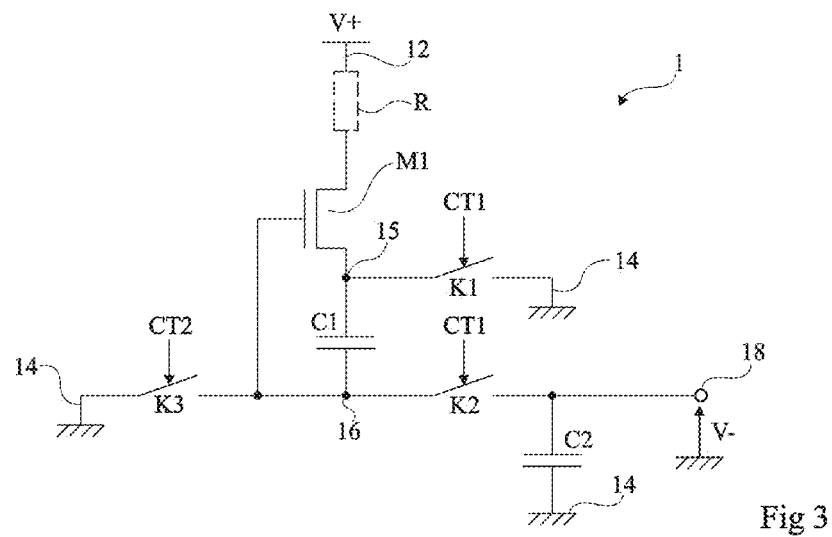
FIG. 3 shows an embodiment of a circuit for generating a negative voltage from a positive voltage.

FIG. 3 shows an example of an electric diagram of an embodiment of a circuit 1 for generating a negative voltage, based on a capacitive charge pump.

A transistor M1, typically a normally-on MOS transistor, is connected, directly or via a resistive element R (illustrated in dotted lines), to a terminal 12 of application of a potential V+ positive with respect to ground (terminal 14). The other power terminal of transistor M1 is connected to a node 16 via a first capacitive element C1 and, to terminal 14, by a first switch K1. The control terminal (the gate) of transistor M1 is connected (directly connected) to node 16. Node 16 is connected, by a second switch K2, to a terminal 18 for providing negative output voltage V− and, by a third switch K3, to terminal 14 of application of the reference potential. Terminal 18 is further connected to terminal 14 by a second capacitive element C2. Switches K1, K2 are controlled in all or nothing by a signal CT1. Switch K3 is controlled in all or nothing by a signal CT3. These switches are, preferably, N-channel MOS transistors.

Figure 4:
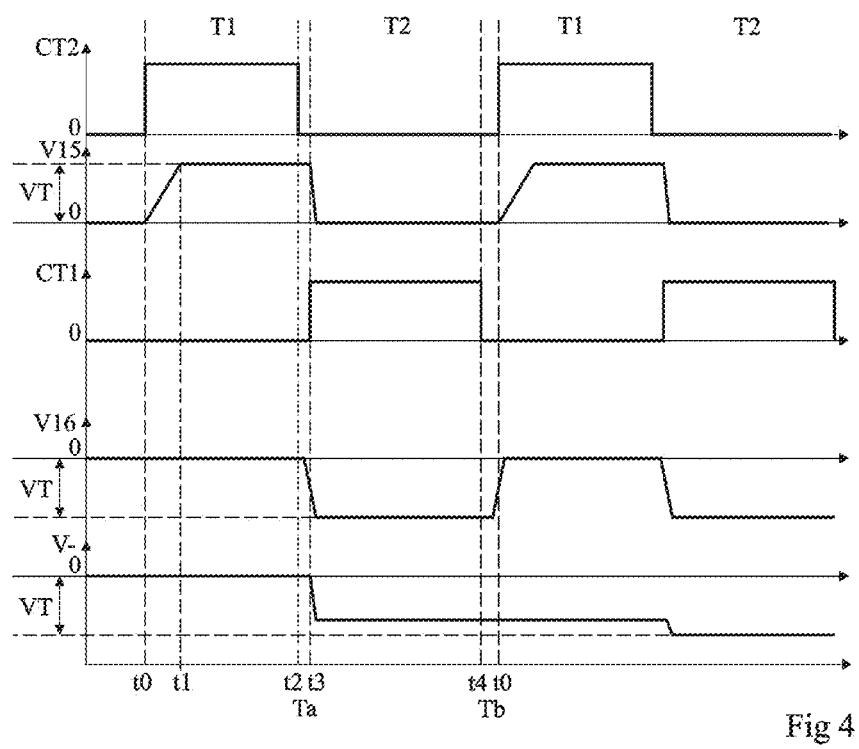
FIG. 4 illustrates, in the form of timing diagrams, the operation of the circuit of FIG. 3.

FIG. 4 illustrates, in the form of timing diagrams, the operation of circuit 1 of FIG. 3.

These timing diagrams respectively show examples of shapes of signal CT2, conditioning the off or on state of switch K3, of voltage V15 of node 15 between transistor M1 and capacitor C1, of signal CT1, conditioning the off or on state of switches K1 and K2, of voltage V16 of node 16, and of output voltage V−.

Taking the preferred example of switches K1, K2, K3 formed of N-channel MOS transistors and, to within the threshold voltages, these transistors are turned on when their gates are connected to a positive potential (high states of signals CT1 and CT2) and are turned off when their gates are grounded (low states of signals CT1 and CT2).

For simplification, the on-state voltage drops in switches K1 to K3 are neglected (the on-state drain-source resistances RdsON are considered as negligible).

An initially discharged state of capacitors C1 and C2 is assumed and all switches K1 to K3 are off. Voltage V− is then zero.

A charge pump cycle starts at a time t0 at which switch K3 is turned on (signal CT2 in the high state), switches K1 and K2 being off (signal CT1 in the low state). Node 15 starts by being grounded. Transistor M1 being normally on, the potential of node 15 increases until a time t1 when voltage V15 reaches threshold voltage VT of transistor M1. This amounts to charging capacitor C1 up to the locking voltage (threshold voltage VT) of transistor M1.

Then, the states of the switches are inverted to transfer the charges from capacitor C1 to capacitor C2. In practice, to avoid a simultaneous conduction of the switches, it is started, at a time t2, subsequent to time t1, by turning off switch K3 (signal CT2 in the low state) and then, at a time t3, subsequent to time t2, switches K1 and K2 are turned on (signal CT1 in the high state).

The fact of taking node 15 to ground, by the turning-on of switch K1, causes the discharge of capacitor C2 and decreases the potential of node 16, and thus of terminal 18 (switch K2 being on), generating negative voltage V−.

At a time t4, subsequent to time t3, a reverse switching phase is started, that is, switches K1 and K2 are turned off (signal CT1 in the low state), after which, at a subsequent time, corresponding to time t0 of beginning of the next cycle, switch K3 is turned on.

In the assembly of FIG. 3, the minimum value (the most negative value) that voltage V− can take is −VT.

According to the power sampled from terminal 18, value −VT is reached in one or a plurality of cycles. In the example of FIG. 4, two cycles are assumed to be necessary.

The duration of phase(s) T1, between time t0 and t2, is selected to be longer than the duration necessary for the charge of capacitor C1 at level VT. This duration is a function, in particular, of the capacitance of capacitor C1 and of the on-state drain-source resistance of transistor M1.

The duration of phase(s) T2, between times t3 and t4, is selected to be longer than the time of recharge of capacitor C1 through transistor M1.

Durations T1 and T2 are not necessarily identical. For example, a shorter duration T2, particularly, at the starting, enables to limit current inrushes.

Intervals Ta between times t2 and t3, and Tb between times t2 and t3, are selected to guarantee an absence of simultaneous conduction of switches K1 to K3.

The biasing of transistor M1 enables to make it normally on, which avoids a starting circuit.

Optional resistive element R is used to limit current inrushes.

An advantage of the circuit described in relation with FIGS. 3 and 4 is that it is compatible with an embodiment only using N-channel MOS transistors.

The fact of making transistor M1 for supplying the switched-capacitance circuit switchable spares a start circuit. Further, advantage is taken of one of the switches used to switch the capacitive elements to switch the power supply transistor.

Figure 5:
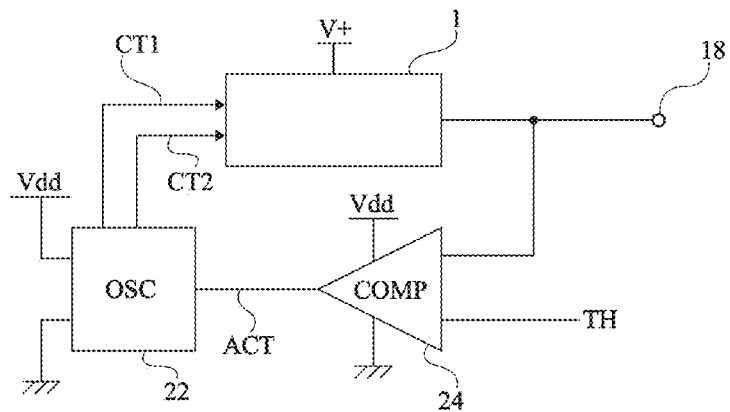
FIG. 5 very schematically illustrates in the form of blocks an example of a circuit for controlling the circuit of FIG. 3.

FIG. 5 shows, in simplified fashion and in the form of blocks, an example of a circuit for generating control signals CT1 and CT2.

In this example, an oscillator 22 (OSC) controlled (activated) by a signal ACT delivered by a comparator 24 (COMP) between output voltage level V− and a threshold TH is used. For the circuit of FIG. 3, threshold TH corresponds to a level higher than level −VT to stop the oscillator and thus decrease the power consumption. As a specific embodiment, a ring oscillator having a period conditioning durations T1 and T2 may be used, signals CT1 and CT2 being sampled at the output of two different inverters of the oscillator to define intervals Ta and Tb (then identical). Oscillator 22 and comparator 24 are powered, for example, with a positive voltage Vdd, which is not necessarily identical to voltage V+.

According to an alternative embodiment, a single-pulse generator, triggered when voltage V− has not reached a set point TH, is used.

According to another alternative embodiment, an analog regulation which monitors the voltage across capacitive element C1 and its discharge into capacitor element C2 is provided.

More generally, any circuit capable of generating control signals to respect the above-described switching phases may be used.

Figure 6:
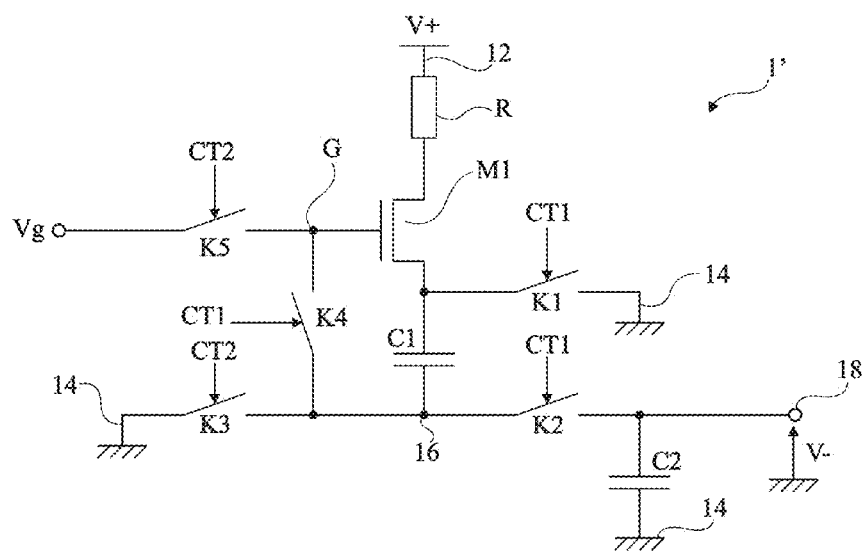
FIG. 6 illustrates a variation of the circuit of FIG. 3.

FIG. 6 shows another embodiment intended to provide an output voltage V−, lower than −VT (higher, in absolute value, than the absolute value of the threshold voltage of transistor M1).

As compared with the circuit of FIG. 3, the gate of transistor M1 is further connected, via a switch K4 controlled by signal CT1, to node 16 and, via a switch K5 controlled by signal CT2, to a bias potential Vg higher than the reference potential (and lower than potential V+). Switches K4 and K5 preferably are NMOS transistors. During phase T1 (FIG. 4), switch K4 is off and switch K5 is on. Potential Vg, applied to the gate of transistor M1, results in the charging of capacitive element C1 to a voltage VT+Vg. During the following phase T2, the inversion of the voltage generated by the capacitive switching results in that voltage V− can reach −Vg-VT. The generation of potential Vg from voltage V+ is not a problem (for example, a resistive bridge, preferably switchable to avoid a permanent power consumption, or a voltage regulator).

Figure 7:
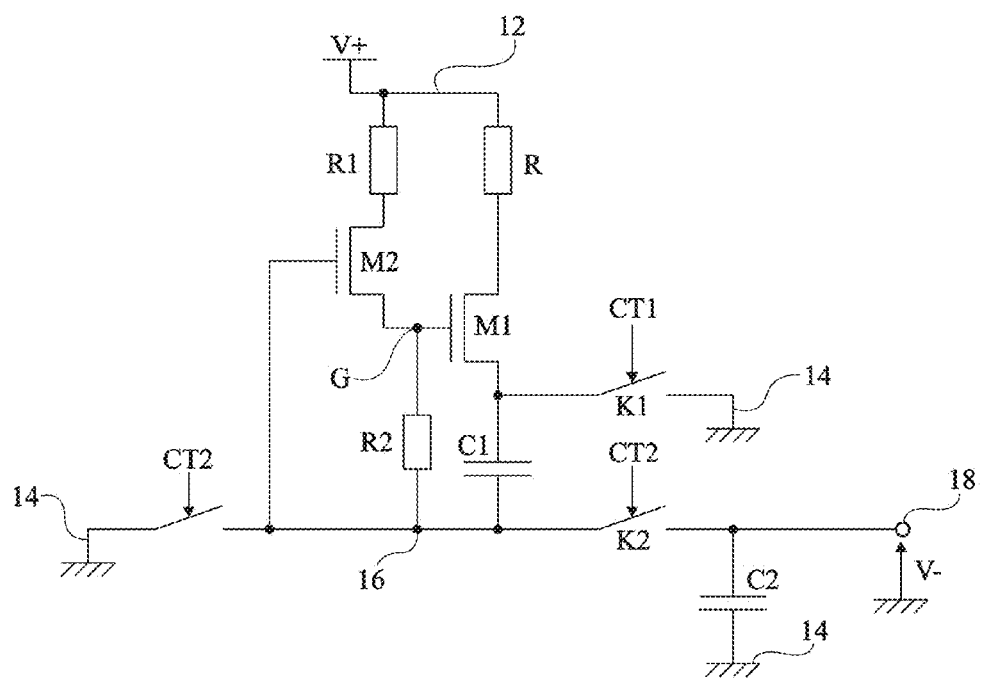
FIG. 7 shows another variation of the circuit of FIG. 3.

FIG. 7 shows another embodiment enabling to reach a voltage more negative than −VT.

As compared with the circuit of FIG. 3, a second MOS transistor M2 connects, optionally in series with a resistive element R1, terminal 12 to the gate of transistor M1, now connected to node 16 by a resistive element R2 (or a capacitive element to decrease the dc power consumption (dc)). The gate of transistor M2 is connected to node 16.

Thus, during phase T1 (FIG. 4), element C1 charges to a value corresponding to the sum of the two threshold voltages of transistors M1 and M2 and the generated negative voltage has this value in absolute value.

The embodiment of FIG. 7 may be extended to even lower negative voltages by adding other transistors on the basis of the same assembly (between the gate of transistor M2 and node 16).

Various embodiments have been described. Various alterations and modifications will occur to those skilled in the art. In particular, time intervals Ta and Tb between periods T1 and T2 of the charge pump circuit may be adapted to the necessary switching times of the different transistors.

Further, although reference has been made to MOS transistors on the application circuit side, the generated negative voltage may be used to control any type of transistor (IGBT, JFET, etc.) and, more generally, to power any type of circuit requiring a negative voltage.

Further, the sizing of capacitive elements C1 and C2, possibly made in the form of a plurality of capacitors in parallel, depends on the application and particularly on the expected power consumption of the element(s) connected to terminal 18.

Finally, the practical implementation of the described embodiments is within the abilities of those skilled in the art based on the functional indications given hereabove and using, for the rest, usual electronic circuit sizing techniques.

The invention claimed is:

1. A circuit for generating a negative voltage from a positive voltage, comprising:
   at least a first transistor between a first terminal of application of a potential higher than a reference potential and a first node;
   a first capacitive element between the first node and a second node, a control terminal of said first transistor being connected to the second node;
   a first switch between the first node and a second terminal of application of the reference potential;
   a second switch between the second node and a third terminal for providing said negative voltage;
   a third switch between the second node and the second terminal; and
   a second capacitive element between the third terminal and the second terminal.

2. The circuit of claim 1, further comprising a first resistive element between the first terminal and the first transistor.

3. The circuit of claim 1, wherein said transistor is an N-channel transistor.

4. The circuit of claim 1, wherein all switches are N-channel MOS transistors.

5. A method for controlling the circuit of claim 1, wherein:
   in a first phase, the first and second switches are off while the third switch is on; and
   in a second phase, the first and second switches are on while the third switch is off.

6. The method of claim 5, wherein the first and second phases are repeated.

7. The method of claim 5, wherein intervals having durations shorter than those of the first and second phases, and wherein all switches are off, are interposed between the successive phases.

8. An electronic circuit comprising at least one circuit of claim 1.

9. A circuit for generating a negative voltage from a positive voltage, comprising:

at least a first transistor between a first terminal of application of a first potential higher than a reference potential and a first node;

a first capacitive element between the first node and a second node;

a first switch between the first node and a second terminal of application of the reference potential;

a second switch between the second node and a third terminal for providing said negative voltage;

a third switch between the second node and the second terminal;

a second capacitive element between the third terminal and the second terminal;

a fourth switch between a control terminal of the first transistor and the second node; and a fifth switch between the control terminal of the first transistor and a fourth terminal of application of a second potential higher than the reference potential and lower than the first potential.

10. A method for controlling the circuit of claim 9, wherein:

during a first phase, the fourth switch is off and the fifth switch is on; and during a second phase, the fourth switch is on and the fifth switch is off.

11. A circuit for generating a negative voltage from a positive voltage, comprising:

at least a first transistor between a first terminal of application of a potential higher than a reference potential and a first node;

a first capacitive element between the first node and a second node;

a first switch between the first node and a second terminal of application of the reference potential;

a second switch between the second node and a third terminal for providing said negative voltage;

a third switch between the second node and the second terminal;

a second capacitive element between the third terminal and the second terminal;

at least a second transistor between the first terminal and a control terminal of the first transistor, the control terminal of the second transistor being connected to the second node; and a second resistive element, interposed between the control terminal of the first transistor and the second node.

12. The circuit of claim 11, further comprising a third resistive element between the second transistor and the first terminal.

* * * * *